United States Patent
Cheng et al.

(10) Patent No.: US 11,749,860 B2
(45) Date of Patent: Sep. 5, 2023

(54) BATTERY REPLACEMENT MECHANISM, BATTERY REPLACEMENT SYSTEM, AND BATTERY REPLACEMENT METHOD

(71) Applicant: Coretronic Intelligent Robotics Corporation, Hsin-Chu (TW)

(72) Inventors: Hsu-Chih Cheng, Hsin-Chu (TW); Ying-Chieh Chen, Hsin-Chu (TW); Chi-Tong Hsieh, Hsin-Chu (TW); I-Ta Yang, Hsin-Chu (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 139 days.

(21) Appl. No.: 17/359,622

(22) Filed: Jun. 27, 2021

(65) Prior Publication Data

US 2021/0408632 A1 Dec. 30, 2021

(30) Foreign Application Priority Data

Jun. 29, 2020 (CN) .......................... 202010606461.9

(51) Int. Cl.
*H01M 50/244* (2021.01)
*H01M 50/264* (2021.01)
(Continued)

(52) U.S. Cl.
CPC ............. *H01M 50/244* (2021.01); *B60K 1/04* (2013.01); *B60L 53/80* (2019.02); *B64U 50/19* (2023.01);
(Continued)

(58) Field of Classification Search
None
See application file for complete search history.

(56) References Cited

U.S. PATENT DOCUMENTS

| 5,091,687 A * | 2/1992 | Meyer ...................... B60K 1/04 320/109 |
| 2010/0145717 A1* | 6/2010 | Hoeltzel ................... B60K 1/04 320/109 |

(Continued)

FOREIGN PATENT DOCUMENTS

| CN | 106068592 | 11/2016 |
| CN | 206123109 | 4/2017 |

(Continued)

OTHER PUBLICATIONS

"Office Action of Taiwan Counterpart Application", dated Aug. 13, 2021, p. 1-p. 3.

*Primary Examiner* — Gregg Cantelmo
(74) *Attorney, Agent, or Firm* — JCIPRNET

(57) ABSTRACT

The disclosure provides a battery replacement mechanism configured to pick and place a battery from and in a first accommodation bay. The first accommodation bay is provided with a first latch to hold the battery therein. The battery replacement mechanism includes a multi-axial slide table assembly, a carrier, and a pick-and-place device. The carrier is movably disposed on the multi-axial slide table assembly, and the pick-and-place device is movably disposed on the carrier. The carrier includes a second latch, and the pick-and-place device includes a catching hook. The second latch is configured to release the first latch of the first accommodation bay, so that the battery may enter and exit the first accommodation bay, and the catching hook is connected to the battery and is configured to drag the battery toward and away from the carrier. The disclosure further provides a battery replacement system and a battery replacement method for a UAV.

31 Claims, 13 Drawing Sheets

(51) Int. Cl.
*B60L 53/80* (2019.01)
*B60K 1/04* (2019.01)
*B64U 50/19* (2023.01)
*H01M 10/42* (2006.01)
*H01M 50/249* (2021.01)

(52) U.S. Cl.
CPC ......... *H01M 10/42* (2013.01); *H01M 50/249* (2021.01); *H01M 50/264* (2021.01); *B60K 2001/0494* (2013.01)

(56) References Cited

U.S. PATENT DOCUMENTS

| | | | |
|---|---|---|---|
| 2014/0061376 A1 | 3/2014 | Fisher et al. | |
| 2017/0129464 A1* | 5/2017 | Wang | H02J 7/0045 |
| 2017/0174091 A1* | 6/2017 | Miller | B64C 39/024 |
| 2017/0282734 A1 | 10/2017 | Noorani et al. | |

FOREIGN PATENT DOCUMENTS

| | | |
|---|---|---|
| CN | 108058848 | 5/2018 |
| CN | 109624935 | 4/2019 |
| CN | 110733663 | 1/2020 |
| WO | 2016015354 | 2/2016 |

* cited by examiner

BATTERY REPLACEMENT MECHANISM, BATTERY REPLACEMENT SYSTEM, AND BATTERY REPLACEMENT METHOD

CROSS-REFERENCE TO RELATED APPLICATION

This application claims the priority benefit of China application serial no. 202010606461.9, filed on Jun. 29, 2020. The entirety of the above-mentioned patent application is hereby incorporated by reference herein and made a part of this specification.

BACKGROUND OF THE DISCLOSURE

1. Field of the Disclosure

The disclosure relates to a battery replacement mechanism, a battery replacement system, and a battery replacement method, and in particular, to a battery replacement mechanism, a battery replacement system, and a battery replacement method for an unmanned aerial vehicle (UAV).

2. Description of Related Art

With the advancement of technology, unmanned aerial vehicles have developed rapidly and numerous types unmanned aerial vehicles emerge. For example, the unmanned aerial vehicles may be used to perform tasks such as monitoring, inspection, transportation of goods, and the like. Generally speaking, in order to take into account operational safety, a battery may be used as a power source of most unmanned aerial vehicles. Therefore, endurance capacity of the unmanned aerial vehicles is limited by battery capacity. When the battery capacity is insufficient, the task may also be prevented from being executed. Therefore, an unmanned aerial vehicle based on solar energy is proposed, in which a solar panel may be installed to supply power to or charge the unmanned aerial vehicle. However, because the solar panel has a smaller area and an insufficient photoelectric conversion rate, the practicability may be not good. Other solutions such as building a charging station for charging the unmanned aerial vehicle by connecting a charging cable require a longer charging time.

Based on the above, a power supply method that can better balance the endurance capacity, working efficiency, and ease of operation of the UAV is an issue that is to be discussed by a person skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY OF THE DISCLOSURE

The disclosure provides a battery replacement mechanism, a battery replacement system, and a battery replacement method, which have a simple structure and can replace and maintain the battery efficiently and without damage, thereby improving the endurance capacity of an unmanned aerial vehicle (UAV) while ensuring working durability, maneuverability, and ease of operation of the UAV.

Other objectives and advantages of the disclosure may further be learned from technical features disclosed in the disclosure.

In order to achieve one or a part or all of the foregoing objectives or other objectives, an embodiment of the disclosure provides a battery replacement mechanism configured to pick and place a battery in a first accommodation bay. The first accommodation bay is provided with a first latch to hold the battery therein. The battery replacement mechanism includes a multi-axial slide table assembly, a carrier, and a pick-and-place device. The carrier is movably disposed on the multi-axial slide table assembly, and the pick-and-place device is movably disposed on the carrier. The carrier includes a second latch, and the pick-and-place device includes a catching hook. The second latch is configured to release the first latch of the first accommodation bay, so that the battery may enter and exit the first accommodation bay, and the catching hook is connected to the battery and is configured to drag the battery toward and away from the carrier.

In order to achieve one or some or all of the above objectives or other objectives, an embodiment of the disclosure provides a battery replacement system for an unmanned aerial vehicle (UAV). The UAV includes a first accommodation bay and a battery. The battery replacement system includes a power station and a battery replacement mechanism. The UAV may be parked in the power station. The power station includes a second accommodation bay provided therein, and each of the first accommodation bay and the second accommodation bay is provided with a first latch to hold the battery in the first accommodation bay or the second accommodation bay. The battery replacement mechanism includes a multi-axial slide table assembly, a carrier, and a pick-and-place device. The carrier is movably disposed on the multi-axial slide table assembly, and the pick-and-place device is movably disposed on the carrier. The carrier includes a second latch, and the pick-and-place device includes a catching hook. The second latch is configured to release the first latch of the first accommodation bay, so that the battery may enter and exit the first accommodation bay, and the catching hook is connected to the battery and is configured to drag the battery toward and away from the carrier.

In order to achieve one or some or all of the above objectives or other objectives, an embodiment of the disclosure provides a battery replacement method for replacing a battery of an unmanned aerial vehicle (UAV) by using a battery replacement system. The UAV includes a first accommodation bay and a battery in the first accommodation bay. The battery replacement system includes a power station and a battery replacement mechanism, the battery replacement mechanism includes a multi-axial slide table assembly, a carrier, and a pick-and-place device, the carrier includes a second latch, and the pick-and-place device includes a catching hook. The power station includes a second accommodation bay, and each of the first accommodation bay and the second accommodation bay is provided with a first latch to hold the battery in the first accommodation bay or the second accommodation bay. The battery replacement method includes: landing the UAV in the power station of the battery replacement system; moving at least one part of the battery replacement mechanism out of the power station; moving the carrier disposed on the multi-axial slide table assembly to a first position, so that the second latch of the carrier is in contact with the first latch of the first accommodation bay; moving the pick-and-place device disposed on the carrier to the pick-and-place position, where at the pick-and-place position, the second latch of the carrier releases the first latch of the first accommodation bay, and the catching hook of the pick-and-place device is connected to the battery; moving the pick-and-place device on the carrier to drag the battery to a fixed position on the carrier; and moving the carrier to a second position on the multi-axial slide table assembly.

Based on the foregoing, the embodiments of the disclosure have at least one of the following advantages or effects. According to the battery replacement mechanism and the battery replacement system of the embodiments of the disclosure, a simple structure is obtained, and the battery replacement or maintenance may be performed efficiently and without damage, thereby improving the endurance capacity of the UAV while ensuring working durability, maneuverability, and ease of operation of the UAV. According to the battery replacement method of the embodiments of the disclosure, the UAV may pick and place the battery from and in the power station, where the battery may be hold in the first accommodation bay of the UAV or/and the second accommodation bay of the power station via the first latch. The second latch of the battery replacement mechanism is used to release the first latch and cooperate with the catching hook of the pick-and-place device to hold the battery, so that battery pick-and-place and replacement may be completed in relatively simple steps. Therefore, the battery of the UAV may be quickly replaced through the battery replacement mechanism disposed in the power station, thereby improving the endurance capacity of the UAV while ensuring maneuverability and operation efficiency thereof to guarantee execution of tasks.

Other objectives, features and advantages of the disclosure will be further understood from the further technological features disclosed by the embodiments of the disclosure where there are shown and described exemplary embodiments of this disclosure, simply by way of illustration of modes best suited to carry out the disclosure.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The content, features, and functions about the foregoing and other technologies of the disclosure will be illustrated below with the accompanying drawings. The directional terms mentioned in the following embodiments, for example, "above", "below", "left", "right", "front" and "back", refer to the directions in the accompanying drawings. Therefore, the directional terms are only used for illustration instead of limiting this disclosure.

Figure 1:
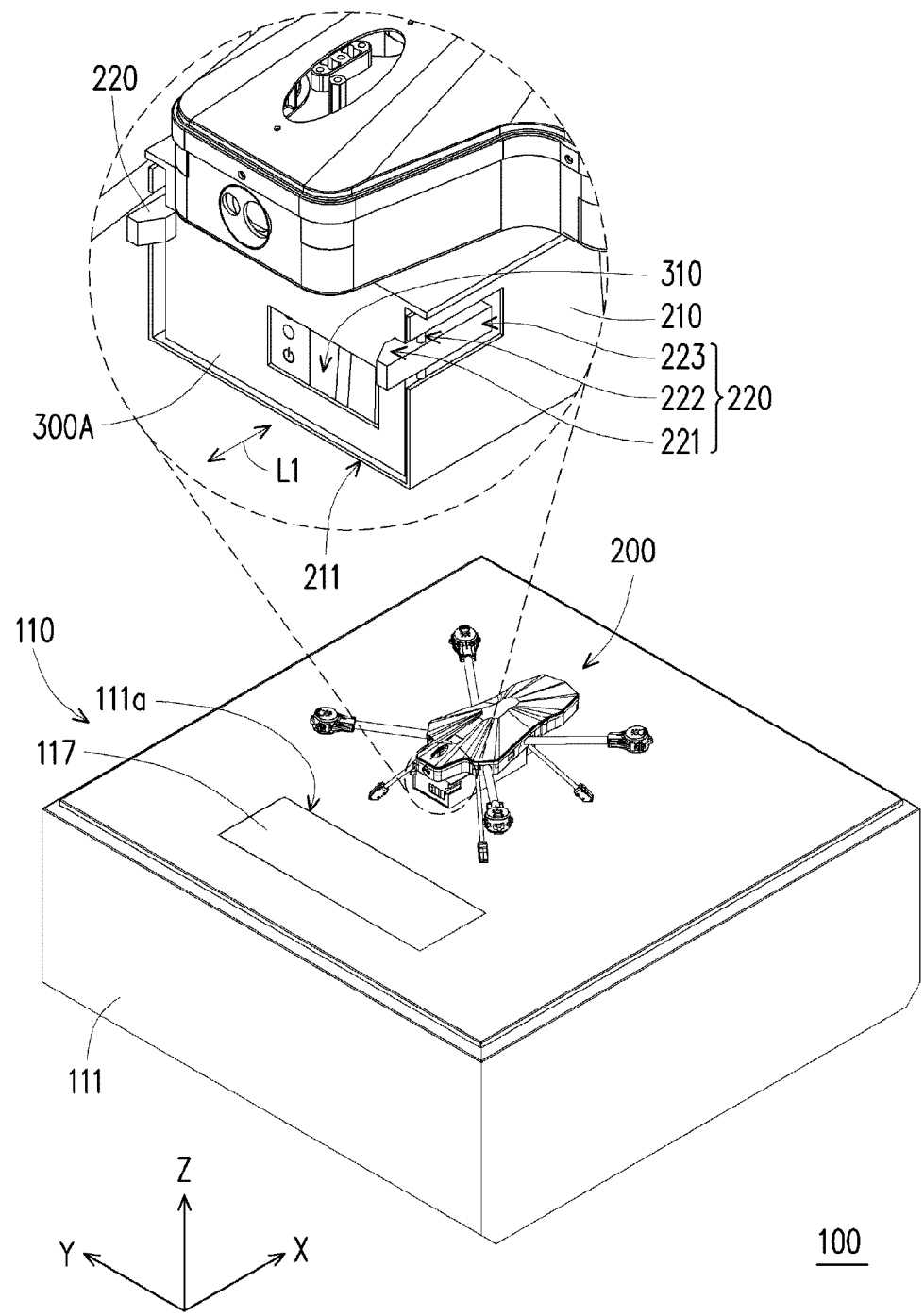
FIG. 1 is a schematic diagram of a battery replacement system according to an embodiment of the disclosure.
Figure 2:
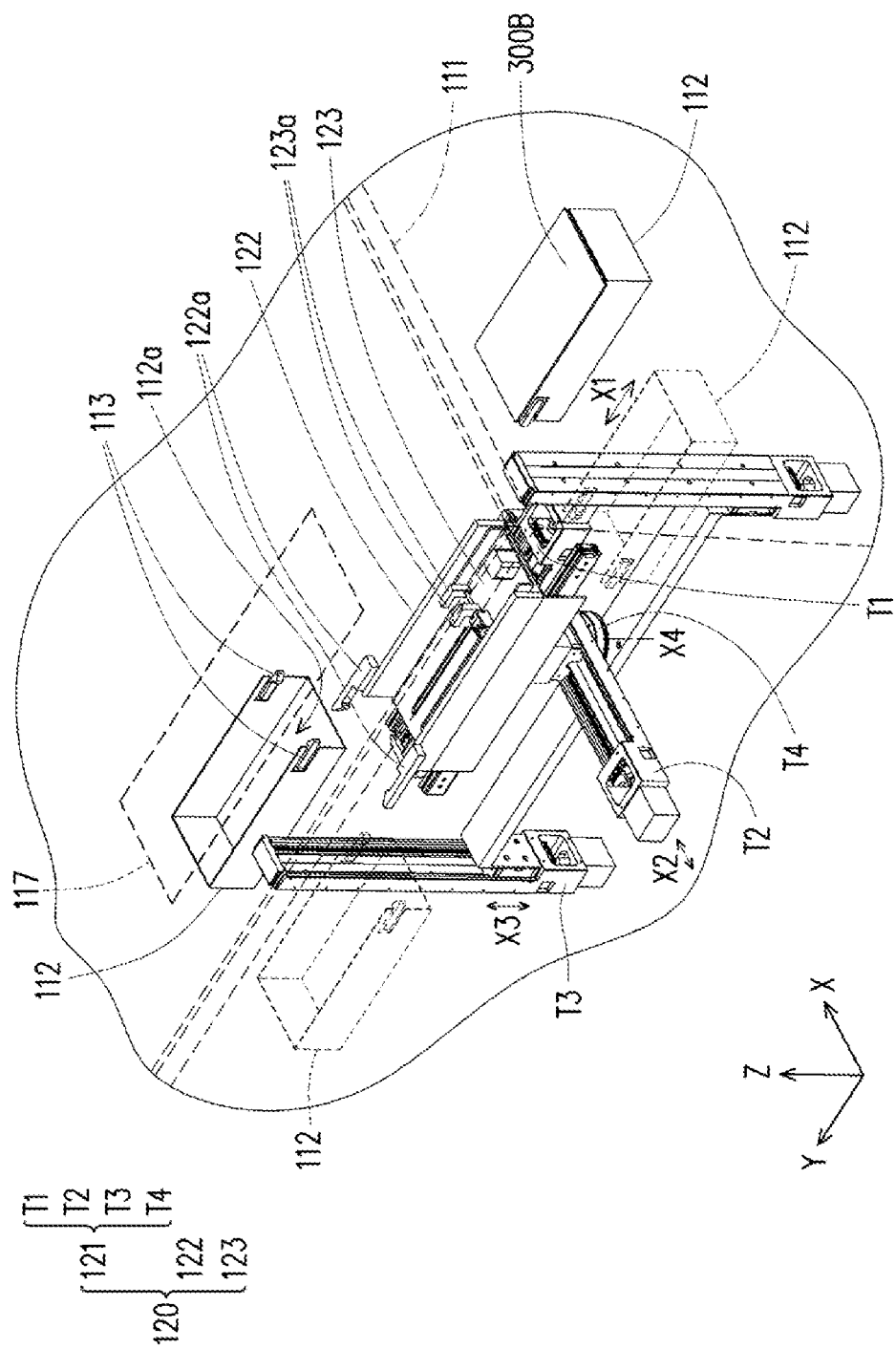
FIG. 2 is a schematic diagram of an internal structure of the battery replacement system of FIG. 1.

FIG. 1 is a schematic diagram of a battery replacement system according to an embodiment of the disclosure. FIG. 2 is a schematic diagram of an internal structure of the battery replacement system of FIG. 1. In order to make the components clearly identified, FIG. 1 only shows a visual appearance, and FIG. 2 shows an internal structure. A rectangular coordinate X-Y-Z is provided to facilitate description of components. Referring to FIG. 1 and FIG. 2, in the embodiment, a battery replacement system 100 may be configured to replace a battery 300A of an unmanned aerial vehicle (UAV) 200. The battery 300A has a slot 310, and the slot 310 is described in detail below.

In some embodiments, the UAV 200 includes a first accommodation bay 210 and a first latch 220. The first accommodation bay 210 is, for example, a cockpit of the UAV 200. The first latch 220 may be pivotally connected to the first accommodation bay 210. For example, the first latch 220 may be pivotally connected to an entrance/exit 211 of the first accommodation bay 210, and may be opened and closed relative to the entrance/exit 211. Specifically, the first latch 220 is unfolded relative to the entrance/exit 211 to facilitate pick-and-place of the battery 300A. In other words, the first latch 220 is unfolded relative to the entrance/exit 211 to facilitate pick-up or placing of the battery 300A. After the battery 300A is placed in the first accommodation bay 210, the first latch 220 is closed relative to the entrance/exit 211, so that the battery 300A may be hold in the first accommodation bay 210. Furthermore, the first latch 220 includes a hook portion 221, a pivot 222, and a leaning portion 223, and the pivot 222 is pivotally connected to the first accommodation bay 210 along a Z-axial direction, so that the first latch 220 may reciprocate around the pivot 222, and the hook portion 221 and the leaning portion 223 are located on two opposite sides of the pivot 222 along an X-axial direction to form a seesaw-like structure. That is, as shown in FIG. 1, the hook portion 221 is farther away from the first accommodation bay 210 than the leaning portion 223. The hook portions 221 of a pair of first latches 220 are in a state of holding the battery 300A from entering and exiting (for example, along a pick-and-place path L1), that is, a closed state. In the state, the battery 300A may be hold in the first accommodation bay 210. When the pair of first latches 220 rotate via the pivot 222 so that the two hook portions 221 are away from each other, that is, in an unfolded state. In this state, the first latch 220 is located outside the pick-and-place path L1 of the battery 300A, so that the battery 300A may enter and exit the first accommodation bay 210 along the pick-and-place path L1 through the entrance/exit 211. A description is subsequently given to picking and placing. It should be noted that a torsion spring (not shown) may be sleeved on the pivot 222, so that the first latch 220 may be smoothly reset.

In some embodiments, the battery replacement system 100 may further include a power station 110 and a battery replacement mechanism 120 (FIG. 2). The power station 110 of the embodiment includes a body 111 and a plurality of second accommodation bays 112 provided in the body 111 (FIG. 2). In the embodiment, the power station 110 may include a lifting pavilion 117, an opening 111a may be provided on a surface of the body 111, and the lifting pavilion 117 is disposed at the opening 111a of the body 111. The lifting pavilion 117 may cover the opening 111a or expose the opening 111a. In some embodiments, the battery replacement mechanism 120 may be disposed aligned with the opening 111a, and when the lifting pavilion 117 is raised relative to the body 111, the battery replacement mechanism 120 may be driven to at least partially enter and exit the power station 110 from the opening 111a.

As shown in FIG. 2, each of the second accommodation bays 112 may be provided with a first latch 113, and the first latch 113 may be pivotally connected to the second accommodation bay 112 and open relative to the entrance/exit 112a of the second accommodation bay 112. In some embodiments, the first latch 113 may hold or release the battery 300B from the second accommodation bay 112. For example, the first latch 220 may hold or release the battery from the first accommodation bay 210.

Referring to FIG. 1 and FIG. 2, in the embodiment, the battery replacement mechanism 120 includes a multi-axial slide table assembly 121, a carrier 122, and a pick-and-place device 123.

In some embodiments, the multi-axial slide table assembly 121 includes a first slide table T1, a second slide table T2, a third slide table T3, and a rotary table T4. The carrier 122 is movably disposed on the multi-axial slide table assembly 121. Specifically, the carrier 122 is movably disposed on the first slide table T1 of the multi-axial slide table assembly 121. The first slide table T1 may be configured to move the carrier 122 along a first axial direction X1, for example, along a Y-axial direction. In the embodiment, the first slide table T1 is assembled onto the second slide table T2, and the second slide table T2 may be configured to move the first slide table T1 along a second axial direction X2, for example, along the X-axial direction. The second slide table T2 is assembled onto the third slide table T3, and the third slide table T3 is configured to move the second slide table T2 and the first slide table T1 along a third axial direction X3, for example, along the Z-axial direction. In a further embodiment, the first axial direction X1, the second axial direction X2, and the third axial direction X3 are orthogonal to each other. For example, as shown in FIG. 2, the X-axial direction, the Y-axial direction, and the Z-axial direction are orthogonal to each other. In the embodiment, it should be noted that, the first slide table T1, the second slide table T2, and the third slide table T3 of the multi-axial slide table assembly 121 may have substantially the same slide table mechanism, and the specific structure thereof will be described below.

In some embodiments, the rotary table T4 of the multi-axial slide table assembly 121 may be connected to the second slide table T2 and the third slide table T3. The rotary table T4 may be configured to rotate the first slide table T1 and the second slide table T2 about a rotating axial direction X4, for example, rotate about the axis parallel to the Z-axial direction. In other words, the rotating axial direction X4 may be substantially parallel to the third axial direction X3, that is, the rotating axial direction X4 is orthogonal to the plane (that is, an X-Y plane) formed by the first axial direction X1 and the second axial direction X2.

In some embodiments, the pick-and-place device 123 is movably disposed on the carrier 122. The carrier 122 includes a second latch 122a, and the pick-and-place device 123 includes a catching hook 123a. The second latch 122a is configured to release the first latch 210 of the first accommodation bay 220, so that the battery 300A may enter and exit the first accommodation bay 210. The catching hook 123a is connected to the battery 300A and is configured to drag the battery 300A toward and away from the carrier 122.

Figure 4:
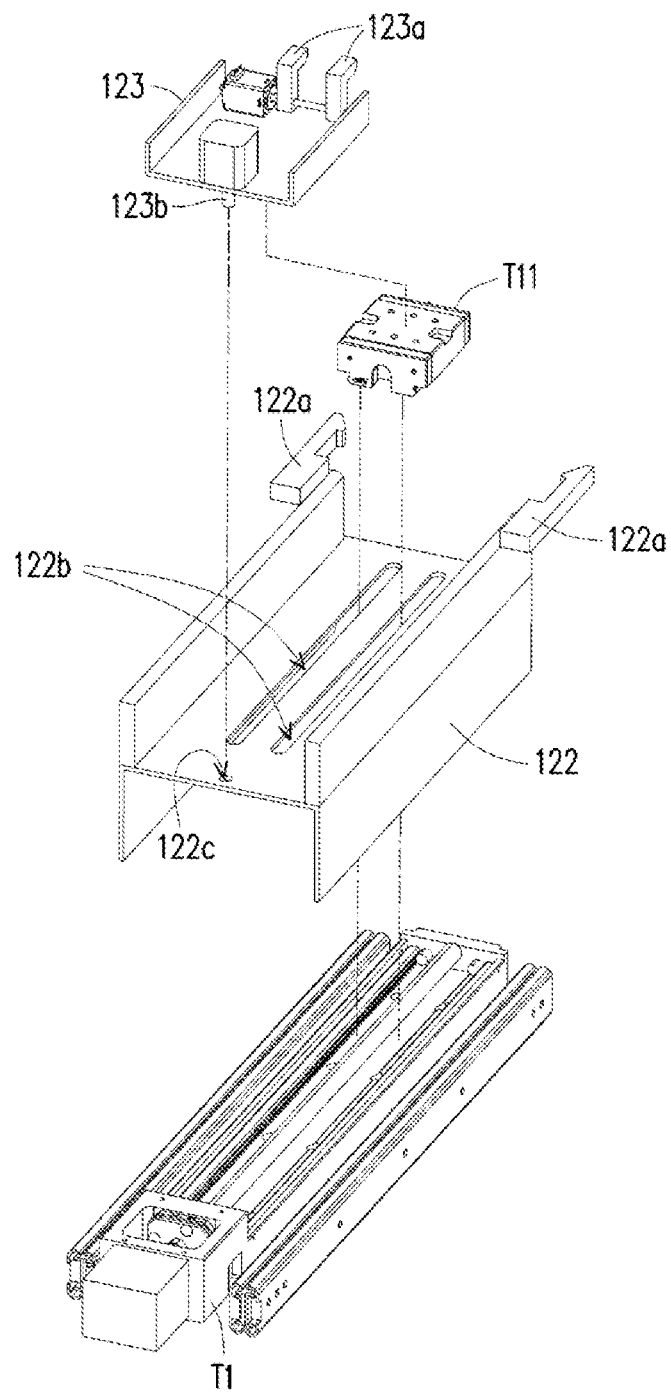
FIG. 4 is a schematic exploded view of some components of a battery replacement mechanism.

Referring to FIG. 4, FIG. 4 is a schematic exploded view of some components of a battery replacement mechanism. In the embodiment, a fixing hole 122c may be provided on the carrier 122, the pick-and-place device 123 may include a movable pillar 123b, and the movable pillar 123b may be inserted into the fixing hole 122c. For example, when the pick-and-place device 123 is moved to a fixed position on the carrier 122, the movable pillar 123b may be inserted into the fixing hole 122c, so that positions of the pick-and-place device 123 and the carrier 122 relative to each other may be fixed, thereby fixing the battery on the carrier 122 at the position. For example, when the movable pillar 123b may be inserted into the fixing hole 122c, the carrier 122 and the pick-and-place device 123 may be synchronously driven via the first slide table T1. In the embodiment, the movable pillar 123b may also be moved out of the fixing hole 122c. In this case, the pick-and-place device 123 is movable relative to the carrier 122.

In the embodiment, at least one rail 122b may be disposed on the carrier 122, and may include at least one slider T11. In the embodiment shown in FIG. 4, at least two rails 122b are disposed on the carrier 122, and include one slider T11. The slider T11 may be inserted into the rail 122b and may move along the rail 122b. In the embodiment, the pick-and-place device 123 may be movably disposed on the carrier 122 via the slider T11, so that the pick-and-place device 123 assembled on the slider T11 is movable along the rail 122b of the carrier 122. For example, the pick-and-place device 123 may be fixed to the slider T11 of the carrier 122.

In the embodiment, it should be noted that the third slide T3 includes a pair of carrier rods T31, and the two carrier rods may form a gantry as shown in FIG. 2 to support a structure disposed thereon, which may provide sufficient support. In a further embodiment, the third slide T3 may be raised and lowered relative to the body 111.

Figure 3:
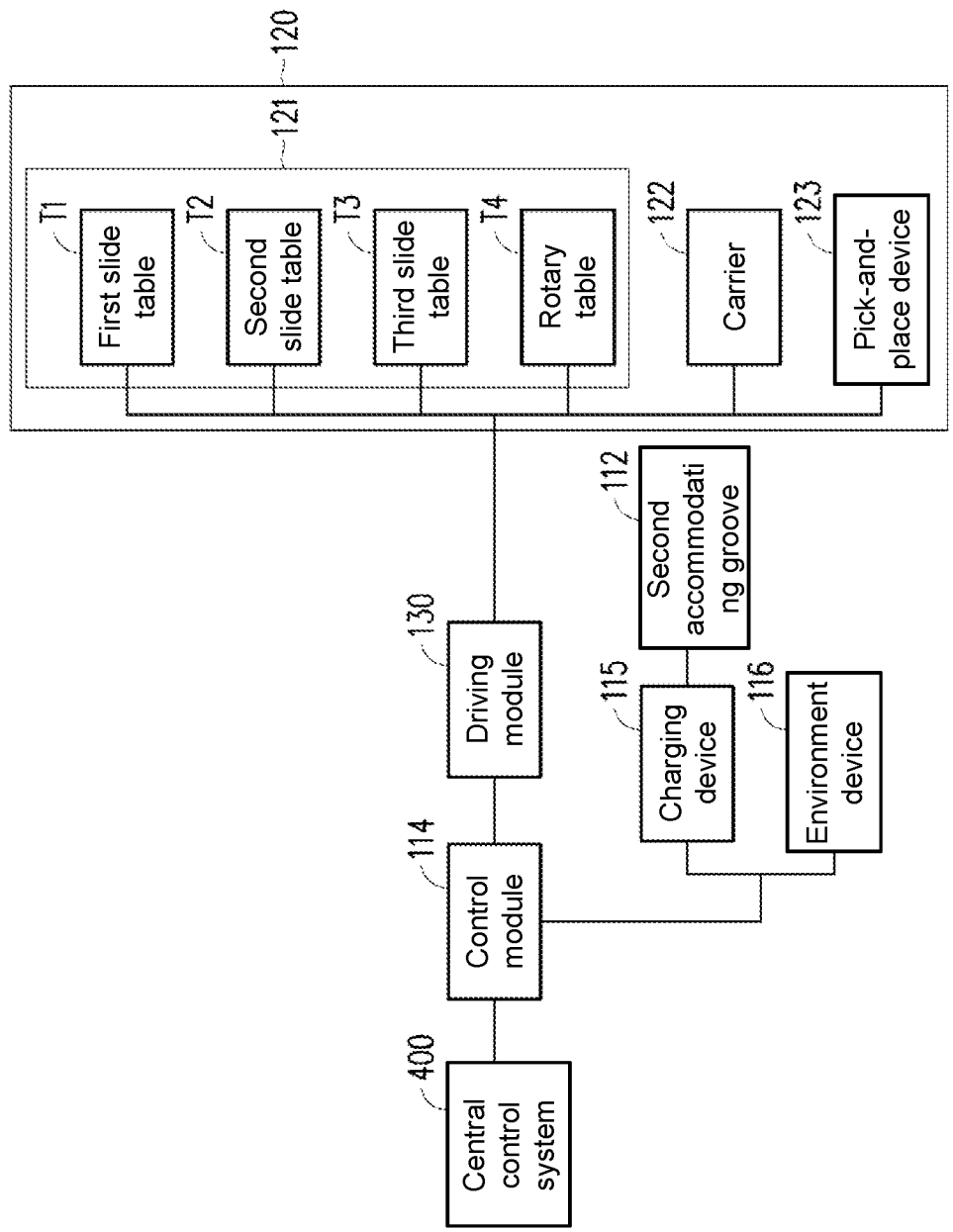
FIG. 3 is a schematic block diagram of the battery replacement system of FIG. 1.

FIG. 3 is a schematic block diagram of the battery replacement system 100 of FIG. 1, to describe an electrical connection relationship between related components. As shown in FIG. 3, the battery replacement system 100 further includes a driving module 130, a control module 114, and a central control system 400. The driving module 130 is electrically connected to the control module 114 and may be configured to drive the battery replacement mechanism 120 into and out of the power station 110. For example, the driving module 130 may include a plurality of motors, which may be controlled by the control module 114 to respectively drive the first slide table T1, the second slide table T2, the third slide table T3, and the rotary table T4 of the multi-axial slide table assembly 121. Further, the driving module 130 may include motors configured to drive the carrier 122 and the pick-and-place device 123 respectively, so that the carrier 122 is movable relative to the first slide table T1, and the pick-and-place device 123 is movable relative to the carrier 122. The driving module 130 may also include a motor for driving the catching hook 123a of the pick-and-place device 123, so that the catching hook 123a may rotate. However, the disclosure is not limited thereto.

In the embodiment, the control module 114 is electrically connected to the central control system 400 and is configured to transmit or receive a signal to or from the central control system 400, so that a user may monitor the status of the battery replacement system 100 at any time. For example, the central control system 400 may adopt a near-end mode or a remote mode, to achieve real-time monitoring and control by the user through wired electrical connection or wireless electrical connection.

In some embodiments, as shown in FIG. 3, the body 111 of the power station 110 may be provided with a charging device 115 and an environmental device 116, and the charging device 115 and the environmental device 116 may be electrically connected to the control module 114. A battery in each of the second accommodation bays 112 may be electrically connected to the charging device 115 via a charging unit. For example, the battery in each of the second accommodation bays 112 may be electrically connected to the charging device 115 through an electrical connector in a wired or wireless charging manner, thereby charging the battery in the second accommodation bay 112.

FIG. 5A to FIG. 5I are each a schematic diagram of a battery replacement process, where some components are dashed to facilitate identification. It should be noted that FIG. 5A to FIG. 5I show the process in which the battery replacement system 100 picks up the battery 300A from the UAV 200, transmits and places the battery 300A into the power station 110. The process of picking up the battery 300B in the power station 110, transmitting and installing the battery 300B into the UAV 200 is essentially a reverse process of the process shown in FIG. 5A to FIG. 5I, and therefore the descriptions thereof are omitted herein.

Referring to FIG. 1 and FIG. 5A to FIG. 5I, in step S01, as shown in FIG. 1, the UAV 200 is landed and parked on the body 111 of the power station 110. Further, a parking position of the UAV 200 may be measured by using a sensing device (not shown), and information about the parking position may be transmitted to the control module 114.

Figure 5A:
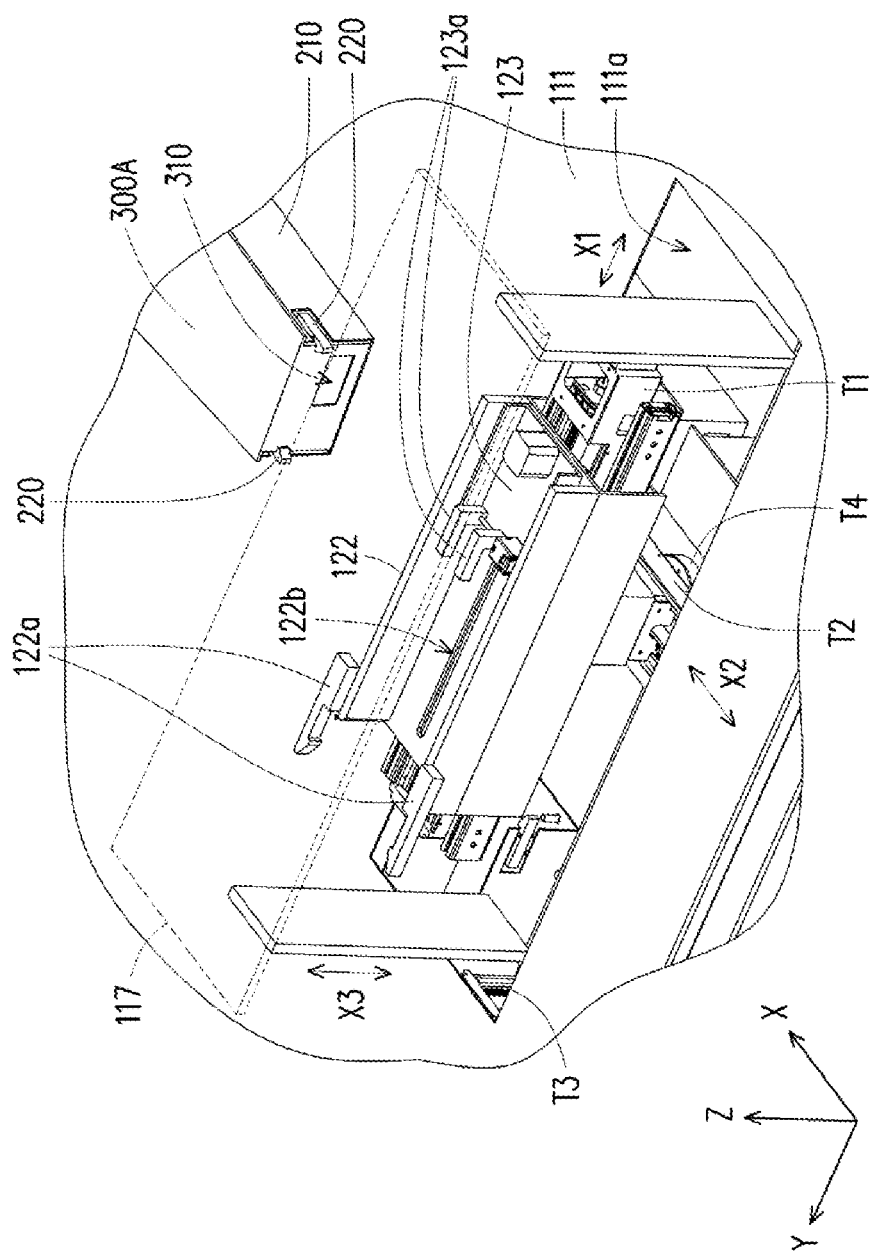
FIG. 5A to FIG. 5I are schematic diagrams of a battery replacement process.

In step S02, as shown in FIG. 5A, the lifting pavilion 117 is moved away from the opening 111a of the body 111. The control module 114 controls the driving module 130, so that the driving module 130 may drive the third slide T3 of the battery replacement mechanism 120 to rise along the third axial direction X3 (the Z-axis), and the first slide table T1, the carrier 122 thereon, and the pick-and-place device 123 may rise outside the body 111.

Figure 5B:
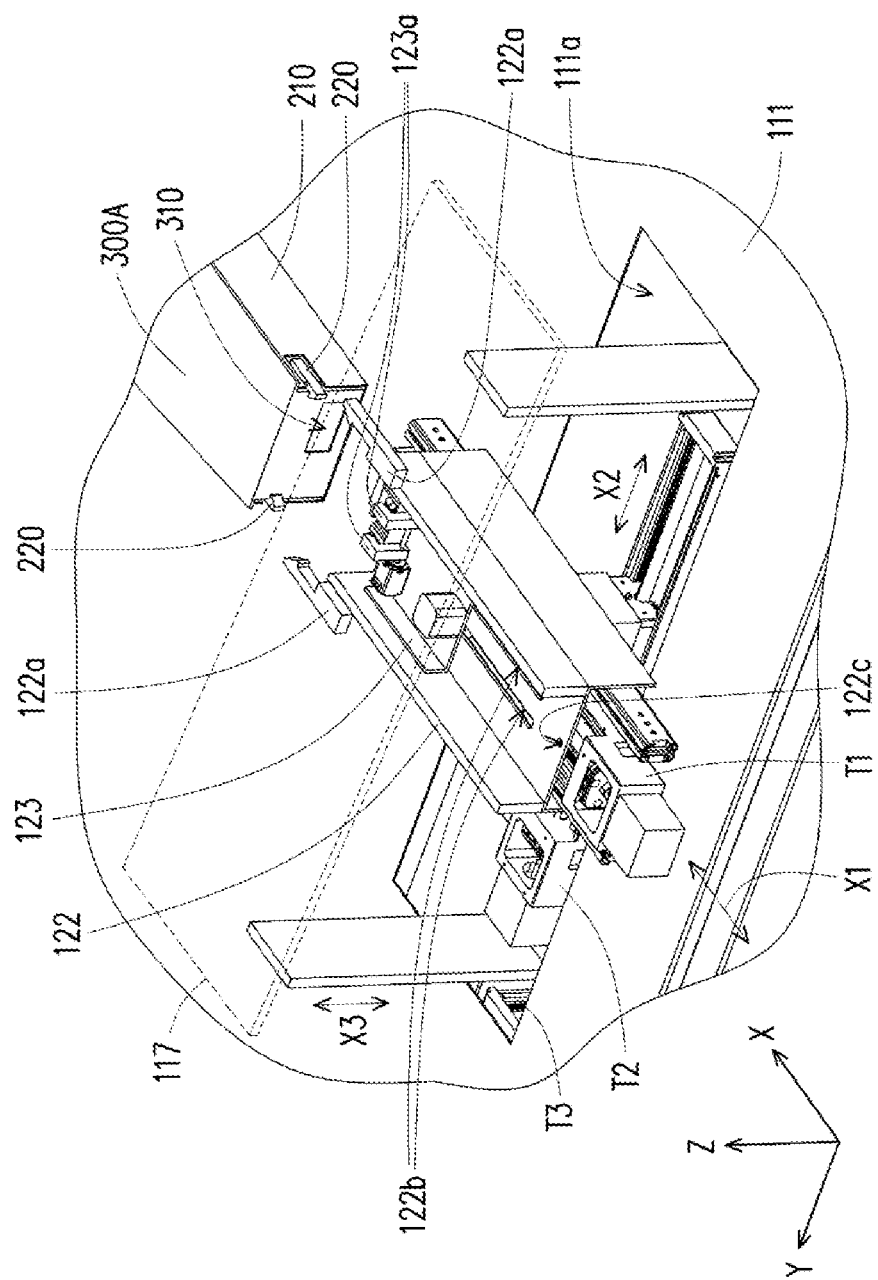

In step S03, from FIG. 5A to FIG. 5B, the control module 114 controls the driving module 130 to drive the rotary table T4 to rotate clockwise by 90 degrees. Herein, the clockwise direction is the clockwise direction in which the body 111 of the power station 110 of FIG. 5A and FIG. 5B is viewed from above. It should be noted that after rotation, the first axial direction X1 of the first slide table T1 extends in a direction parallel to the X-axis, the second axial direction X2 of the second slide table T2 extends in a direction parallel to the Y-axis, and the first axial direction X1 is orthogonal to the second axial direction X2. As shown in FIG. 5B, the first slide table T1 and the carrier 122 are exposed from the body 111, and the second slide table T2 is located in the body 111. However, the disclosure is not limited thereto. In other embodiments, the driving module 130 may further drive the third slide table T3 to rise along the third axial direction X3 (Z-axis), so that the second slide table T2, the first slide table T1, and the carrier 122 are exposed from the body 111.

In step S04, as shown in FIG. 5B, the control module 114 controls the driving module 130 to drive the first slide table T1 to move, so that the carrier 122 and the pick-and-place device 123 move toward the first accommodation bay 210, and the carrier 122 may be moved toward the UAV 200 to the first position. At the first position, the second latch 122a of the carrier 122 may be in contact with the first latch 220 of the first accommodation bay 210. Further, when the first slide table T1 is moved, the driving module 130 may also drive the pick-and-place device 123 simultaneously or sequentially, so that the pick-and-place device 123 is moved to the pick-and-place position on the carrier 122. When the pick-and-place device 123 is located at the pick-and-place position, the catching hook 123a of the pick-and-place device 123 may be aligned with the slot 310 of the battery 300A.

Figure 5C:
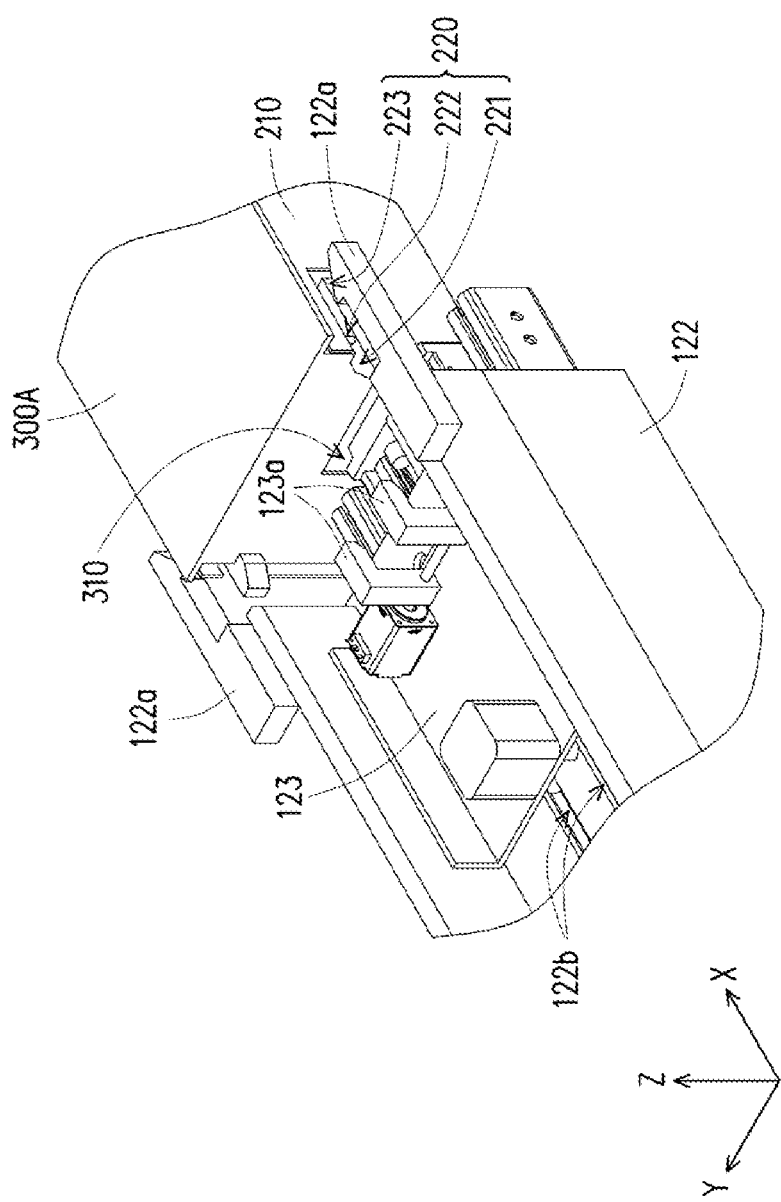
Figure 5D:
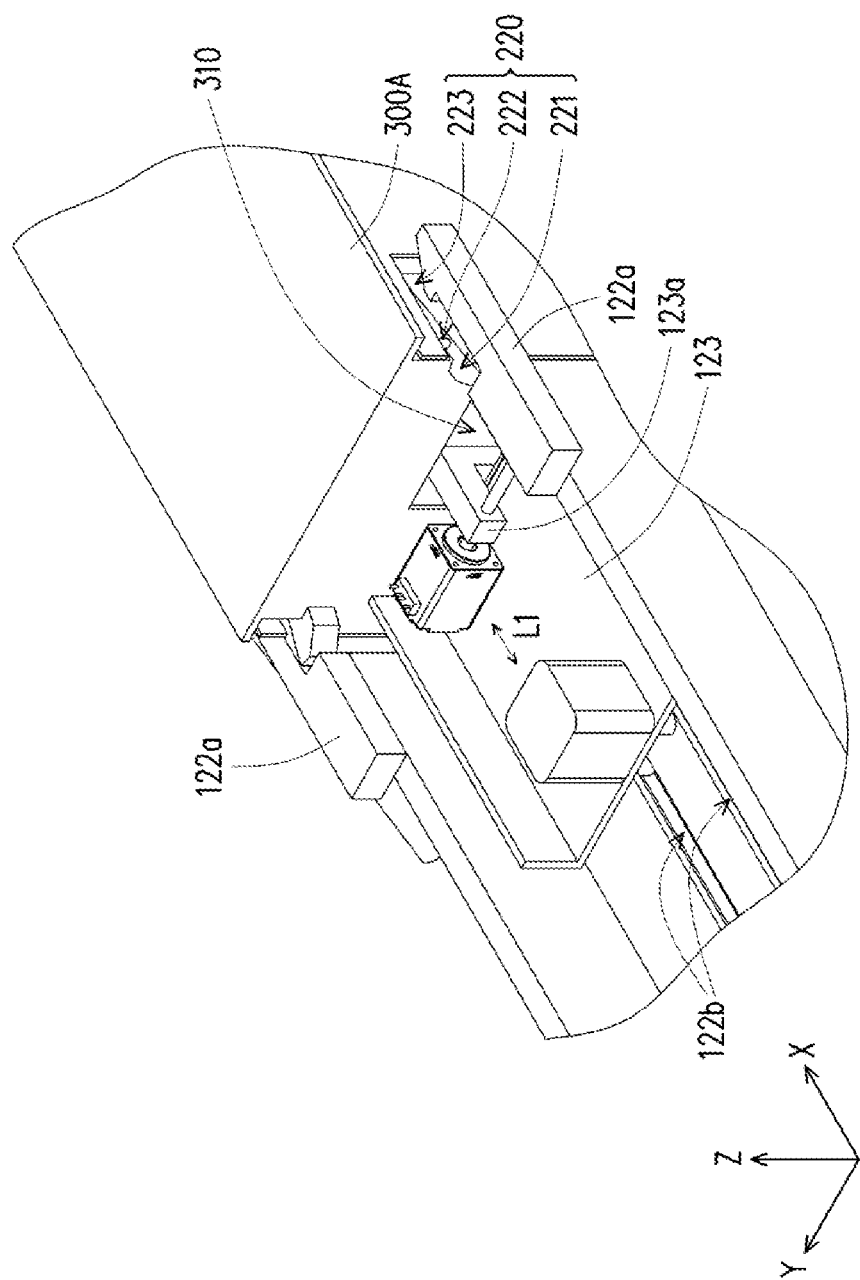

In step S05, as shown in FIG. 5C, when the carrier 122 is located at the first position, the second latch 122a of the carrier 122 may lean against a leaning portion 223 of the first latch 220, so that the hook portion 221 releases the battery 300A. Specifically, as shown in FIG. 5D, when a pair of second latches 122a presses the leaning portion 223 of the first latch 220, the first latch 220 rotates about the pivot 222, so that the hook portion 221 is moved away from a pick-and-place path L1 of the battery 300A. In this way, the second latch 122a releases the first latch 220 of the first accommodation bay 210, so that the first latch 220 may release the battery 300A.

In step S06, as shown in FIG. 5D, when the pick-and-place device 123 is located at the pick-and-place position, the catching hook 123a of the pick-and-place device 123 may be driven to rotate, for example, the catching hook 123a may be rotated by 90 degrees around the rotation axis, and the rotation axis may extend, for example, along a direction parallel to the Y-axis. In the embodiment, the catching hook 123a may be L-shaped, for example, and after the catching hook 123a is rotated, a front end thereof may be inserted and locked in the slot 310 of the battery 300A. That is, the catching hook 123a may be engaged with an edge of the slot 310 of the battery 300A to be connected to the battery 300A. It should be noted that the foregoing steps may be performed simultaneously or sequentially.

Figure 5E:
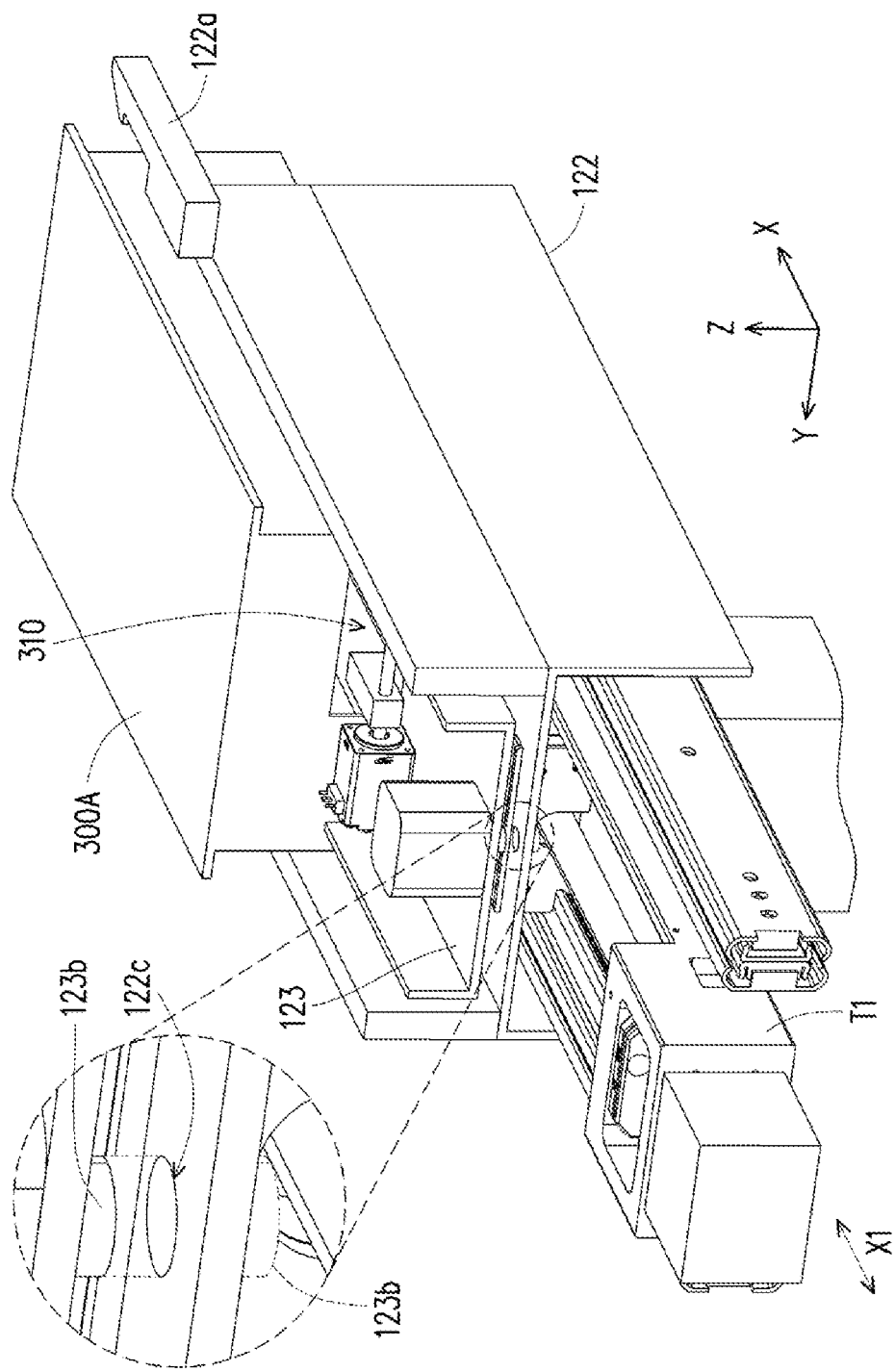

In step S07, as shown in FIG. 5E, the control module 114 controls the driving module 130 to drive the pick-and-place device 123 to move on the carrier 122 (as shown in FIG. 5E, move along—the X-axial direction), so that the pick-and-place device 123 drags the battery 300A to a fixed position on the carrier 122. At a fixed position, a movable pillar 123b of the pick-and-place device 123 directly faces the fixing hole 122c of the carrier 122, and the movable pillar 123b may be driven to be inserted into the fixing hole 122c of the carrier 122. It should be noted that, in FIG. 5E, the movable pillar 123b includes a solid line drawing part and a dashed line drawing part, where the solid line drawing part represents a part of the movable pillar 123b that is not inserted into the fixing hole 122c, and the dashed line drawing part represents a part of the movable pillar 123b that has been inserted into the fixing hole 122c. In this way, the battery 300A may be fixed onto the carrier 122 to provide sufficient protection and a fixing effect for the battery 300A during the transmission.

Figure 5F:
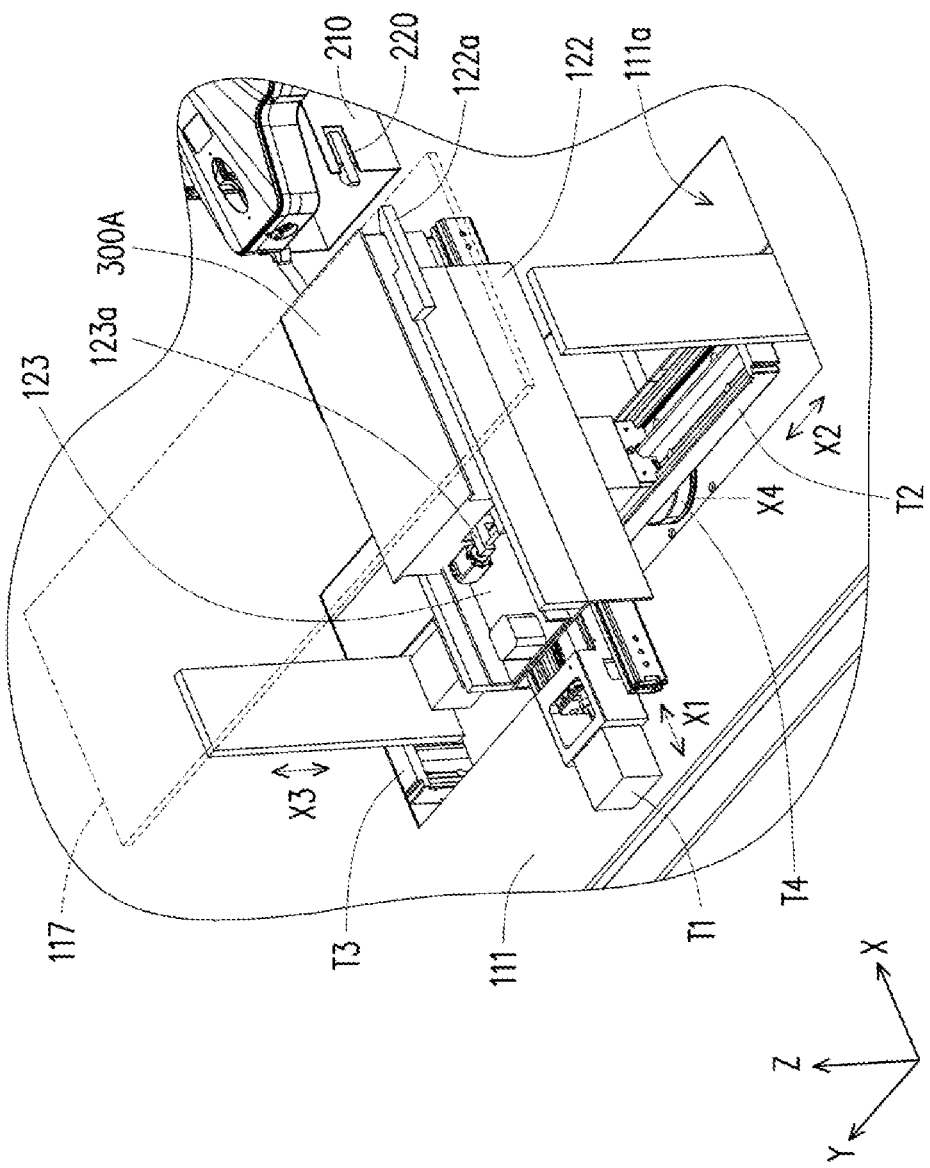

In step S08, as shown in FIG. 5F, the control module 114 controls the driving module 130 to drive the first slide table T1 to move, so that the carrier 122, the pick-and-place device 123, and the battery 300A move along the −X-axial direction.

Figure 5G:
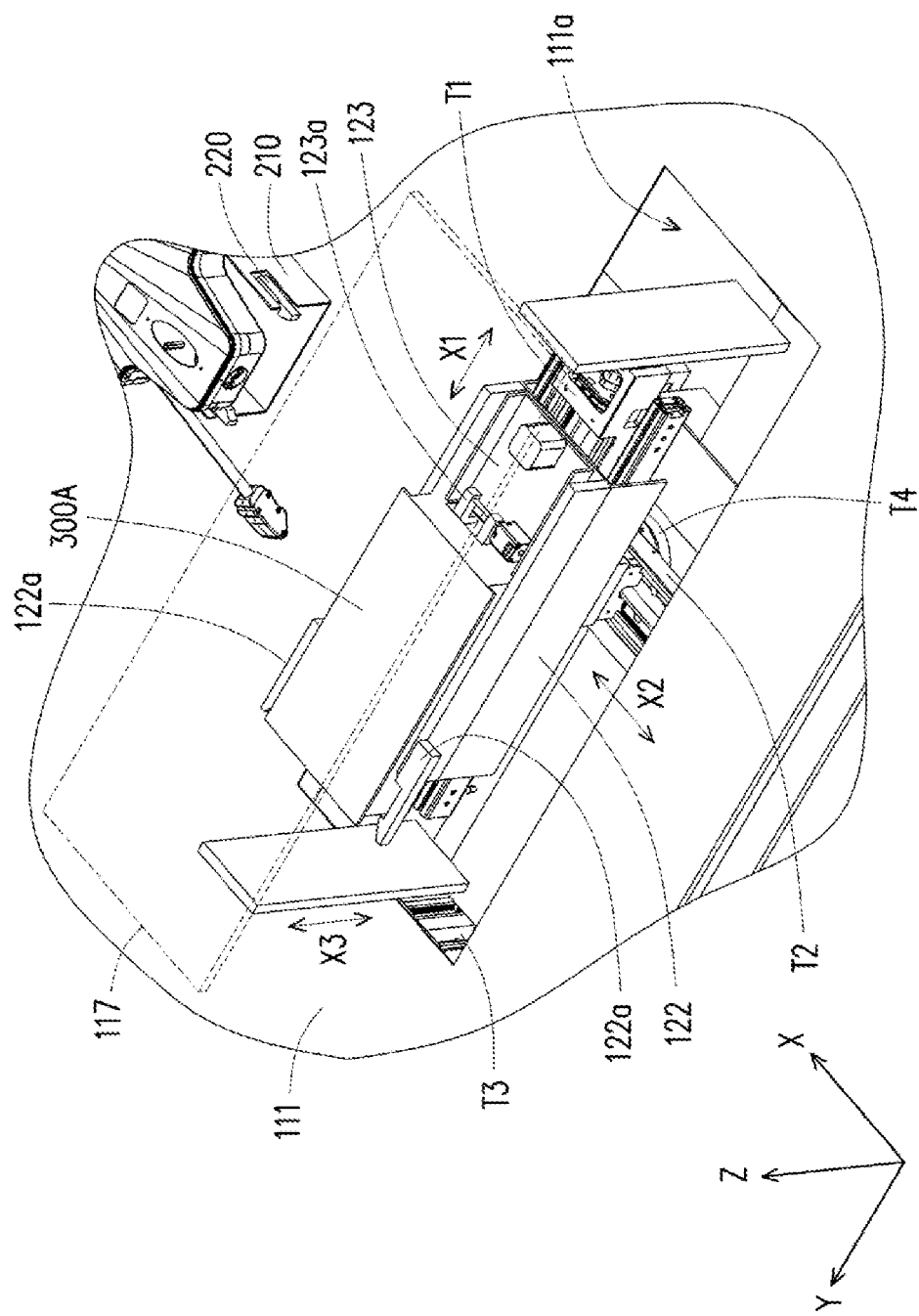

In step S09, as shown in FIG. 5G, the control module 114 controls the driving module 130 to drive the rotary table T4 to rotate anticlockwise by 90 degrees, so that the carrier 122 is moved to a second position. At the second position, the first axial direction X1 of the first slide table T1 extends in a direction parallel to the Y-axis, and the second axial direction X2 of the second slide table T2 extends in a direction parallel to the X-axis. It should be noted that, the clockwise direction is the clockwise direction in which the body 111 is viewed from above. It should be noted that the foregoing steps may be performed simultaneously or sequentially.

Figure 5H:
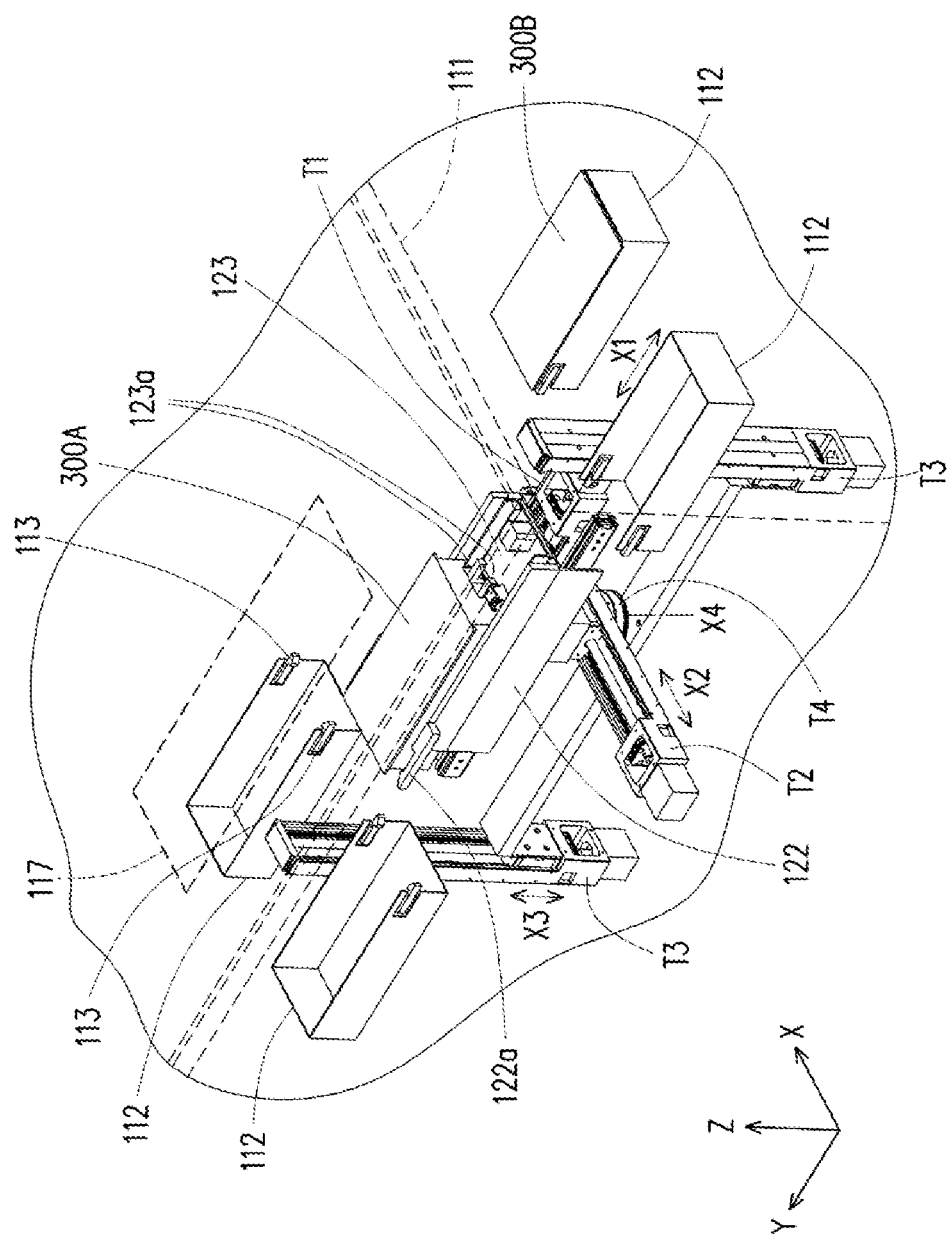

In step S10, as shown in FIG. 5H, the control module 114 controls the driving module 130 to drive the third slide table T3 to move, so that the battery replacement mechanism 120 is lowered into the body 111. Specifically, the first slide table T1 and the carrier 122 thereon, the pick-and-place device 123, and the battery 300A are lowered into the body 111.

Figure 5I:
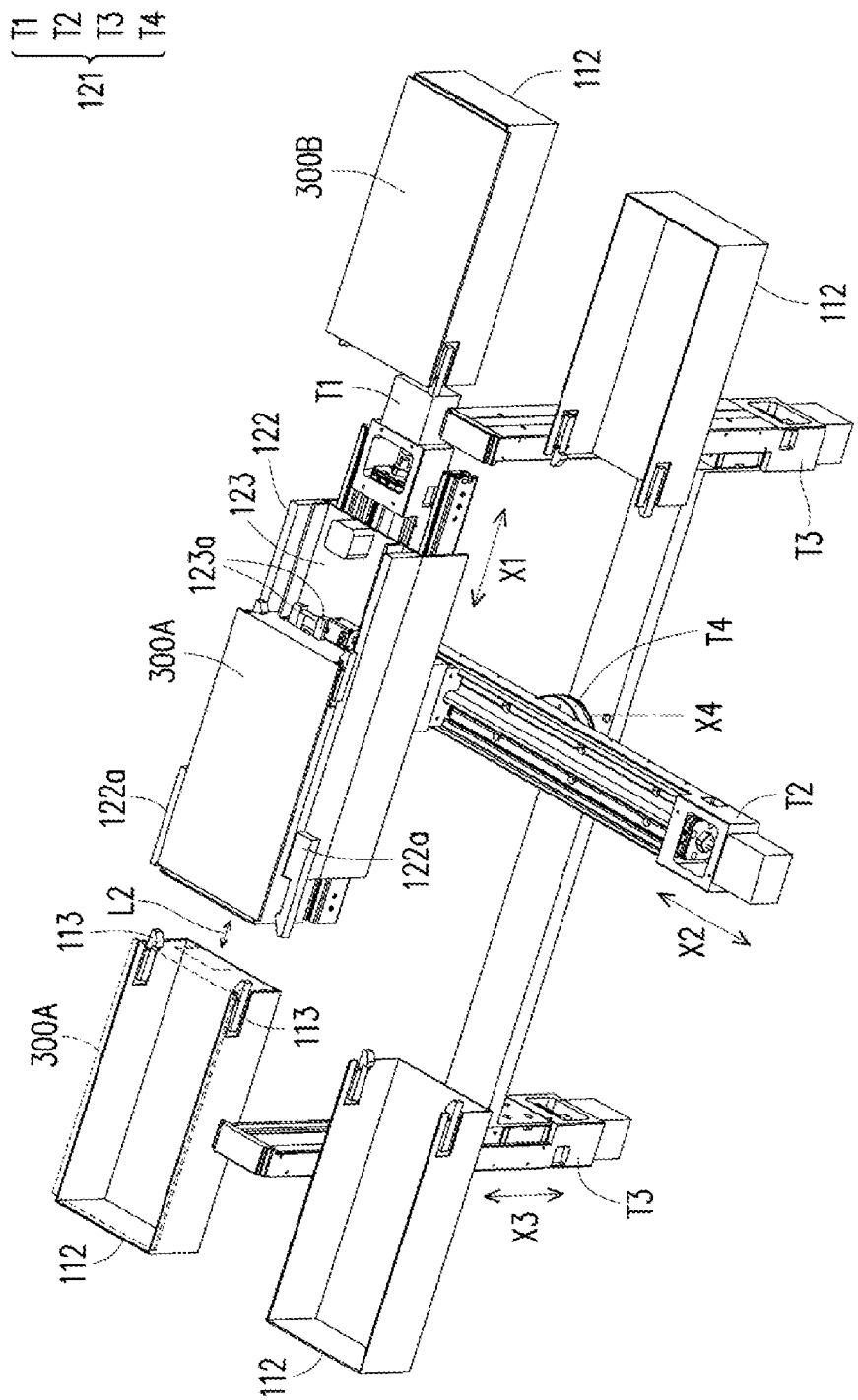

In step S11, as shown in FIG. 5I, the control module 114 controls the driving module 130 to drive the second slide table T2 to move, thereby moving the first slide table T1, the carrier 122, and the pick-and-place device 123 to move the battery 300A into one of the second accommodation bays 112, where the second accommodation bay 112 has a vacant position that may accommodate the battery 300A. It should be noted that, since a plurality of second accommodation bays 112 are provided in the embodiment, and the second accommodation bays 112 may be provided at a plurality of positions relative to the multi-axial slide table assembly 121, FIG. 5H and FIG. 5I are only examples, and the disclosure is not limited thereto. In other embodiments, the control module 114 may also control the driving module 130 to drive the rotary table T4 to rotate, thereby moving the first slide table T1, the second slide table T2, the carrier 122, and the pick-and-place device 123 to move the battery 300A into other second accommodation bays 112.

In some embodiments, a combined structure of the first latch 113 and the second accommodation bay 112 is similar to a combined structure of the first latch 220 and the first accommodation bay 210. Therefore, the process of moving the battery 300A into the second accommodation bay 112 in step S11 is substantially reverse to steps S05 and S06 described above. The details are not described herein again, and only a difference is briefly described as follows. In step S11, as shown in FIG. 5I, the second latch 122a releases the first latch 113 of the second accommodation bay 112, so that the first latch 113 may release the battery 300A. Furthermore, since the front end of the first latch 113 is an inclined plane, the battery 300A may be easily pushed up while being moved into the second accommodation bay 112 and rotate the first latch 113, so that a hook portion of the first latch 113 is moved away from a pick-and-place path L2. When the battery 300A completely enters the second accommodation bay 112, the second latch 122a is detached from the leaning portion of the first latch 113, and the hook portion of the first latch 113 may be reset through a torsion spring disposed on the pivot, so that the hook portion of the first latch 113 is moved to the pick-and-place path to complete the action of holding the battery 300A.

In step S12, the battery 300A in the second accommodation bay 112 may be electrically connected to the charging device 115 via a charging unit, thereby charging the battery 300A. Further, a charging method includes wired charging and wireless charging.

In the embodiment, the charging device 115 may detect whether there is a battery in the second accommodation bay 112. For example, when there is a battery 300B in the second accommodation bay 112, the control module 114 may detect remaining power of the battery 300B, to charge, discharge the battery 300B or only accommodate the battery 300B. In detail, since the charging device 115 may be electrically connected to the control module 114, the control module 114 may obtain, via the charging device 115, relevant electrical information of the battery 300B located in the second accommodation bay 112, for example, a charging voltage, a charging current, power, charging and discharging times, a battery temperature, and a combination of these characteristics. According to the information above, the control module 114 may adjust a charging voltage and/or a charging current. Furthermore, when the plurality of second accommodation bays 112 in the body 111 store a plurality of batteries 300B, the control module 114 may obtain the electrical information of each battery 300B, to manage the batteries 300B differently. For example, the control module 114 may charge each battery 300B according to the remaining power of each battery 300B or in a predetermined order. Further, the control module 114 may transmit the relevant electrical information of the battery 300B to the central control system 400.

In step S13, the control module 114 may determine that the battery 300B is fully charged according to the relevant electrical information of the battery 300B. The control module 114 controls the driving module 130 to drive the battery replacement mechanism 120 to take out the battery 300B from the second accommodation bay 112 and move the battery 300B into the first accommodation bay 210 of the UAV 200. The process is substantially reverse to the process shown in FIG. 5A to FIG. 5I, the details are not described herein again, and only a difference is briefly described as follows. The carrier 122 disposed on the multi-axial slide table assembly 121 is moved to be close to one (for example, a second accommodation bay used to accommodate the battery 300B in FIG. 5I) of the second accommodation bays 112, so that the second latch 122a of the carrier 122 is in contact with the first latch 113 of the second accommodation bay 112. The pick-and-place device 123 disposed on the carrier 122 is moved close to the battery 300B as a backup battery, so that the second latch 122a releases the first latch 113, and the catching hook 123a of the pick-and-place device 123 is connected to the backup battery (the battery 300B). The pick-and-place device 123 is moved on the carrier 122 to drag the backup battery (the battery 300B) to a fixed position on the carrier 122. At least one part of the battery replacement mechanism 120 is moved out of the power station 110. The carrier 122 disposed on the multi-axial slide table assembly 121 is moved to a first position, so that the second latch 122a of the carrier 122 is in contact with the first latch 220 of the first accommodation bay 210 of the UAV 200. The pick-and-place device 123 disposed on the carrier 122 is moved to a pick-and-place position, so that the catching hook 123a of the pick-and-place device 123 places the backup battery (the battery 300B) in the first accommodation bay 210 of the UAV 200. The second latch 122a of the carrier 122 is detached from the first latch 220 of the first accommodation bay 210, so that the backup battery (the battery 300B) may be hold in the first accommodation bay 210. It should be noted that the foregoing steps may be performed simultaneously or sequentially.

In this way, the battery replacement system 100 may complete the battery replacement process for the UAV 200, that is, removing the battery 300A from the UAV 200 and reinstall the battery 300B. It should be noted that the battery replacement process of the UAV 200 described above may be repeated in cycles.

In some embodiments, the environmental device 116 includes, for example, elements such as an environmental sensor, a heater, a cooler (not shown), and the like that are configured to detect or adjust an environmental factor. For example, the environmental device 116 with the environmental sensor may be configured to sense the temperature and humidity in the body 111 and the temperature and humidity of the external environment, and accordingly drive the heater or cooler to perform warming, cooling, or humidity adjustment on space in the body 111, so that the battery 300B in the second accommodation bay 112 may be in the state of the optimal operating temperature, thereby achieving the effect of properly storing the battery 300B.

Based on the above, the embodiments of the disclosure have at least one of the following advantages or effects. According to the battery replacement mechanism and the battery replacement system of the embodiments of the disclosure, a simple structure is obtained, and the battery replacement or maintenance may be performed efficiently and without damage, thereby improving the endurance capacity of the UAV while ensuring working durability, maneuverability, and ease of operation of the UAV. According to the battery replacement method of the embodiment of the disclosure, the unmanned aerial vehicle may pick and place the battery from and in the power station, where the battery may be hold in the first accommodation bay of the UAV or/and the second accommodation bay of the power station via the first latch. The second latch of the battery replacement mechanism is used to release the first latch, and cooperates with the catching hook of the pick-and-place device to hold the battery, so that battery pick-and-place and replacement may be completed in relatively simple steps.

Furthermore, the multi-axial slide table assembly provides a battery replacement system with a simple mechanism to rotate to complete the process of transmitting the battery, and therefore the power station is allowed to complete the battery replacement process in a thin, light, and small volume. A plurality of second accommodation grooves provided in the power station are electrically connected to the charging device and the control module, so as to obtain the relevant electrical information of batteries in the second accommodation groove to serve as a basis for selecting the backup battery in the battery replacement process. Moreover, the battery replacement system is further provided with related environmental devices to adjust the environmental temperature and humidity in the body, to maintain the battery in a better operating temperature. In addition, the foregoing information may also be transmitted to the central control system, so that the user may monitor the battery status in real time.

Based on the above, the battery of the UAV may be quickly replaced through the battery replacement mechanism disposed in the power station, thereby improving the endurance capacity of the UAV while ensuring maneuverability and operation efficiency thereof to guarantee execution of tasks.

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A battery replacement mechanism configured to pick and place a battery from and in a first accommodation bay, wherein the first accommodation bay is provided with at least one first latch configured to hold the battery in the first accommodation bay, and the battery replacement mechanism comprises a multi-axial slide table assembly, a carrier, and a pick-and-place device, wherein
the carrier is movably disposed on the multi-axial slide table assembly; and
the pick-and-place device is movably disposed on the carrier, wherein the carrier comprises at least one second latch, and the pick-and-place device comprises at least one catching hook, the at least one second latch is configured to release the at least one first latch of the first accommodation bay, so that the battery is allowed to enter and exit the first accommodation bay, and the at least one catching hook is connected to the battery and is configured to drag the battery toward and away from the carrier.

2. The battery replacement mechanism according to claim 1, wherein the multi-axial slide table assembly comprises:
a first slide table, wherein the carrier is disposed on the first slide table, and the first slide table is configured to move the carrier along a first axial direction;
a second slide table, wherein the first slide table is assembled onto the second slide table, and the second slide table is configured to move the first slide table along a second axial direction; and
a third slide table, wherein the second slide table is assembled onto the third slide table, and the third slide table is configured to move the second slide table and the first slide table along a third axial direction, wherein the first axial direction, the second axial direction, and the third axial direction are perpendicular to each other.

3. The battery replacement mechanism according to claim 2, wherein the multi-axial slide table assembly further comprises:
a rotary table connected between the second slide table and the third slide table and configured to rotate the first slide table and the second slide table about a rotation axis, wherein
the rotation axis is parallel to a plane formed by the first axial direction and the second axial direction.

4. The battery replacement mechanism according to claim 1, wherein a fixing hole is provided on the carrier, the pick-and-place device comprises a movable pillar, and the movable pillar is inserted into the fixing hole when the pick-and-place device is moved to a fixed position on the carrier, so as to fix positions of the pick-and-place device and the carrier relative to each other.

5. The battery replacement mechanism according to claim 1, wherein at least one rail is disposed on the carrier, the carrier comprises at least one slider, and the at least one slider is inserted into the at least one rail and is movable along the at least one rail.

6. The battery replacement mechanism according to claim 5, wherein the pick-and-place device is fixed onto the at least one slider of the carrier, and is movable along the at least one rail of the carrier.

7. The battery replacement mechanism according to claim 1, wherein the at least one first latch is pivotally connected to the first accommodation bay, and the first latch comprises a hook portion and a leaning portion, wherein the hook portion is farther away from the first accommodation bay than the leaning portion.

8. The battery replacement mechanism according to claim 7, wherein when the at least one second latch leans against the leaning portion, the hook portion is moved away from a pick-and-place path of the battery, and when the at least one second latch is detached from the leaning portion, the hook portion is moved onto the pick-and-place path of the battery.

9. The battery replacement mechanism according to claim 8, wherein when the pick-and-place device is moved to a pick-and-place position on the carrier, the at least one second latch is configured to lean against the leaning portion, so that the hook portion releases the battery, and the at least one catching hook is connected to the battery.

10. The battery replacement mechanism according to claim 9, wherein the battery has a slot aligned with the at least one catching hook of the pick-and-place device, and the at least one catching hook is rotated by 90 degrees to be engaged with an edge of the slot of the battery.

11. The battery replacement mechanism according to claim 1, wherein the first accommodation bay comprises a cockpit disposed on an unmanned aerial vehicle.

12. A battery replacement system for an unmanned aerial vehicle comprising a first accommodation bay and a battery, the battery replacement system comprising a power station and a battery replacement mechanism, wherein
the unmanned aerial vehicle is parked on the power station, the power station comprises a body and at least one second accommodation bay, the at least one second accommodation bay is disposed in the body, and each of the first accommodation bay and the at least one second accommodation bay is provided with at least one first latch to hold the battery in the first accommodation bay or the at least one second accommodation bay; and
the battery replacement mechanism comprises a multi-axial slide table assembly, a carrier, and a pick-and-place device, wherein
the carrier is movably disposed on the multi-axial slide table assembly; and
the pick-and-place device is movably disposed on the carrier, wherein
the carrier comprises at least one second latch, the pick-and-place device comprises at least one catching hook, and the at least one second latch is configured to release the at least one first latch of the first accommodation bay or the at least one second accommodation bay, so that the battery is allowed to enter and exit the first accommodation bay or the at least one second accommodation bay, and the at least one catching hook is connected to the battery and is configured to drag the battery toward and away from the carrier.

13. The battery replacement system according to claim 12, further comprising a driving module configured to drive the battery replacement mechanism to enter and exit the power station.

14. The battery replacement system according to claim 13, wherein the multi-axial slide table assembly comprises a first slide table, a second slide table, a third slide table, and a rotary table, and the driving module comprises a plurality of motors that are respectively configured to drive the first slide table, the second slide table, the third slide table, the rotary table, the carrier, and the pick-and-place device to move.

15. The battery replacement system according to claim 13, wherein the power station further comprises a lifting pavilion, an opening is provided on a surface of the body, and the lifting pavilion is disposed at the opening of the body and is allowed to be lifted and lowered relative to the body to expose or cover the opening.

16. The battery replacement system according to claim 15, wherein the battery replacement mechanism may be disposed aligned with the opening, and when the lifting pavilion is lifted relative to the body, the driving module drives the battery replacement mechanism to enter and exit the power station through the opening.

17. The battery replacement system according to claim 12, wherein the power station further comprises a charging device electrically connected to each of the at least one second accommodation bay, to charge the battery located in the at least one second accommodation bay.

18. The battery replacement system according to claim 13, further comprising a control module electrically connected to the power station, the driving module, and the battery replacement mechanism.

19. The battery replacement system according to claim 18, wherein the control module is further electrically connected to each of the at least one second accommodation bay in the power station, to obtain electrical information of the battery located in the at least one second accommodation bay.

20. The battery replacement system according to claim 19, wherein the control module adjusts, according to the electrical information, a charging voltage and/or a charging current for charging the battery.

21. The battery replacement system according to claim 19, wherein the control module transmits the electrical information of the battery to a central control system.

22. A battery replacement method, for replacing a battery of an unmanned aerial vehicle by using a battery replacement system, wherein
the unmanned aerial vehicle comprises a first accommodation bay and a battery in the first accommodation bay,
the battery replacement system comprises a power station and a battery replacement mechanism, the battery replacement mechanism comprises a multi-axial slide table assembly, a carrier, and a pick-and-place device, the carrier comprises at least one second latch, and the pick-and-place device comprises at least one catching hook,
the power station comprises at least one second accommodation bay, and each of the first accommodation bay and the at least one second accommodation bay is provided with at least one first latch to hold the battery in the first accommodation bay or the at least one second accommodation bay, wherein
the battery replacement method comprises steps of:
landing the unmanned aerial vehicle in the power station of the battery replacement system;
moving at least a part of the battery replacement mechanism out of the power station;
moving the carrier disposed on the multi-axial slide table assembly to a first position, so that the at least one second latch of the carrier is in contact with the at least one first latch of the first accommodation bay;
moving the pick-and-place device disposed on the carrier to a pick-and-place position;
at the pick-and-place position, releasing the at least one second latch of the carrier from the at least one first latch of the first accommodation bay, and connecting the at least one catching hook of the pick-and-place device to the battery;
moving the pick-and-place device on the carrier to drag the battery to a fixed position on the carrier; and
moving the carrier to a second position on the multi-axial slide table assembly.

23. The battery replacement method according to claim 22, wherein
the multi-axial slide table assembly comprises a first slide table, a second slide table, a third slide table, and a rotary table that are assembled together, the first slide table, the second slide table, and the third slide table are respectively configured to move along a first axial direction, a second axial direction, and a third axial direction, the rotary table is connected between the second slide table and the third slide table, and the carrier is disposed on the first slide table, wherein
after the at least one part of the battery replacement mechanism is moved out of the power station, the step of moving the carrier to the first position comprises: rotating, by the rotating table, the first slide table and the second slide table clockwise by 90 degrees about a rotation axis.

24. The battery replacement method according to claim 23, wherein after the pick-and-place device drags the battery to the fixed position on the carrier, the step of moving the carrier to the second position comprises: rotating, by the rotating table, the first slide table and the second slide table counterclockwise by 90 degrees about the rotation axis.

25. The battery replacement method according to claim 22, wherein a fixing hole is provided on the carrier, the pick-and-place device comprises a movable pillar, and the step of dragging, by the pick-and-place device, the battery to the fixed position comprises: inserting the movable pillar into the fixing hole, to fix positions of the pick-and-place device and the carrier relative to each other.

26. The battery replacement method according to claim 22, further comprising steps of:
moving the battery replacement mechanism into the power station; and
moving, by the battery replacement mechanism, the battery into one of the at least one second accommodation bay.

27. The battery replacement method according to claim 26, wherein the battery replacement system further comprises a control module electrically connected to the power station and the battery replacement mechanism, and the power station further comprises a charging device electrically connected to the at least one second accommodation bay, wherein the battery replacement method further comprises steps of:
charging, by the charging device, the battery located in the at least one second accommodation bay;
adjusting, by the control module, a charging voltage and/or a charging current for charging the battery; and
transmitting, by the control module, electrical information of the battery to a central control system.

28. The battery replacement method according to claim 22, further comprising steps of:
moving the carrier disposed on the multi-axial slide table assembly to be close to one of the at least one second accommodation bay, so that the at least one second latch of the carrier is in contact with the at least one first latch of the one of the at least one second accommodation bay;
moving the pick-and-place position disposed on the carrier to be close to a backup battery in the one of the at least one second accommodation bay, so that the at least one second latch releases the at least one first latch, and the at least one catching hook of the pick-and-place device is connected to the backup battery;
moving the pick-and-place device on the carrier to drag the backup battery to the fixed position on the carrier;
moving the at least one part of the battery replacement mechanism out of the power station;
moving the carrier disposed on the multi-axial slide table assembly to the first position, so that the at least one second latch of the carrier is in contact with the at least one first latch of the first accommodation bay;
moving the pick-and-place device disposed on the carrier to the pick-and-place position, so that when the at least one second latch of the carrier releases the at least one first latch of the first accommodation bay, the at least one catching hook of the pick-and-place device places the backup battery into the first accommodation bay; and detaching the at least one second latch of the carrier from the at least one first latch of the first accommodation bay, so that the backup battery is hold in the first accommodation bay.

29. The battery replacement method according to claim 28, wherein after the at least one part of the battery replacement mechanism is moved out of the power station, the step of moving the carrier to the first position comprises: rotating, by the rotating table, the first slide table and the second slide table clockwise by 90 degrees about a rotation axis.

30. The battery replacement method according to claim 28, further comprising a step of:

moving the battery replacement mechanism into the power station.

31. The battery replacement method according to claim 28, wherein the steps of the battery replacement method are performed cyclically.

* * * * *